United States Patent [19]
Brown

[11] Patent Number: 5,775,939
[45] Date of Patent: Jul. 7, 1998

[54] INTERFACE ASSEMBLY FOR PERIPHERAL ACCESSORIES

[75] Inventor: David A. Brown, Indianapolis, Ind.

[73] Assignee: Lucent Technologies Inc., Murray Hill, N.J.

[21] Appl. No.: 727,684

[22] Filed: Oct. 8, 1996

[51] Int. Cl.$^6$ .................................................. H01R 27/00
[52] U.S. Cl. ........................................................ 439/502
[58] Field of Search .................................. 439/502, 505, 439/638, 639; 307/147

[56] References Cited

U.S. PATENT DOCUMENTS

| | | | |
|---|---|---|---|
| 5,470,239 | 11/1995 | Rancourt | 439/654 |
| 5,573,425 | 11/1996 | Morisawa et al. | 439/502 |

*Primary Examiner*—Neil Abrams

[57] ABSTRACT

An accessory connector and adapted assembly (30) that utilizes a connection to the reference voltage line (19') of the interface (19) between a personal computer (10) and its keyboard or other accessory (14), thereby avoiding the need to provide an independent power supply circuit for peripheral devices and accessories such as a microphone (20), speakers or the like. The adapter assembly (30) is configured with a first interface (28) having, by way of illustrative example, a male connector portion (28A) dimensioned for insertion into the keyboard port or PS2 port (19) of a personal computer and a female connector portion (28B) dimensioned to accommodate the male termination (18) of a conventional keyboard cable (17). The adapter assembly further includes a second interface (26) for providing power to the one or more external peripheral devices. By way of illustrative example, the second interface may include one or more jacks, male or female, to accommodate the terminating connector of a cable associated with one or more audio speakers and/or a loudspeaker. As a further example, a first connector (26A) of second interface (26) will connect to an audio peripheral input (32) located at the rear of a processing unit (16) of the computer (10), and an accessory conductor plug 24 of a microphone (24) will connect to a second connector (26B).

13 Claims, 2 Drawing Sheets

INTERFACE ASSEMBLY FOR PERIPHERAL ACCESSORIES

TECHNICAL FIELD

The present invention relates generally to peripheral devices for personal computers.

BACKGROUND OF THE INVENTION

The proliferation of the personal computer has made numerous electronic technologies, including audio signal processing, video signal processing and data processing, available to individual users. The applications currently receiving the highest level of interest are multimedia presentations, telecommunications, and speech recognition. Multimedia refers to the integration of text, audio, graphics, still image and moving pictures into a single, computer-controlled, multimedia product and includes the combination of computers, video disk or compact disk players, video monitors, optical scanners, audio cards, music synthesizers, etc., all linked together by powerful developmental software. Telecommunications, on the other hand, includes applications for communicating by electronic transmission signals from devices such as telephones, radio, and television.

Computers configured for multimedia and/or telecommunications applications generally include a sound card having one or more jacks to accommodate stereo speakers. For telecommunications and/or speech recognition applications, a microphone and microphone port is also provided. Heretofore, audio peripheral devices of the aforementioned type have been powered by an independent power supply such, for example, as an A/C adapter configured with a suitable transformer to provide the required reference voltage. As such, each time the computer is switched on, the user must also switch on the power supply to the audio peripheral device(s) prior to launching a multimedia, telecommunications, or speech recognition application. Likewise, the user must also remember to switch off the power to the peripheral device(s) when the computer system is powered down. Further disadvantages associated with the use of independent power supplying arrangements are the unattractive array of cables and electrical and electronic connections required, and the cost of a power transformer.

SUMMARY OF THE INVENTION

Accordingly, the present invention provides an accessory connector and adapter assembly that overcomes the above described disadvantages and deficiencies of the prior art. The adapter assembly utilizes a connection to the reference voltage line of the interface between a personal computer and one of its PS2 ports, thereby avoiding the need to provide an independent power supply circuit for peripheral devices and accessories such as microphones, speaker systems and other computer peripherals.

The adapter assembly of the present invention is configured with a first interface having, by way of illustrative example, a male connector portion dimensioned for insertion into the PS2 port of a personal computer and a female connector portion dimensioned to accommodate the male termination of a PS2 peripheral such as a mouse or keyboard. It will be readily appreciated by those skilled in the art, of course, that various connector configurations are possible and that the decision to employ a male or female connector in a given situation will necessarily depend upon the nature and structure of the pre-existing connection between the PS2 connected peripheral and the PS2 port.

The adapter assembly of the present invention further includes a second interface for providing power to one or more external peripheral devices such, for example, as audio peripheral devices used in multimedia, telecommunications, or speech recognition applications. By way of illustrative example, the second interface may include one or more jacks, male or female, to accommodate the terminating connector of a cable associated with a microphone and/or a monaural loudspeaker. Reference voltage terminals within the first interface are electrically connected to the jack(s) of the second interface to thereby provide power to the external peripheral device(s), with ground connection being made, for example, to an interfacing internal card.

BRIEF DESCRIPTION OF THE DRAWINGS

For a more complete understanding of the present invention and for further advantages thereof, reference is now made to the following brief description, taken in conjunction with the accompanying figures, in which.

DETAILED DESCRIPTION

Figure 1:
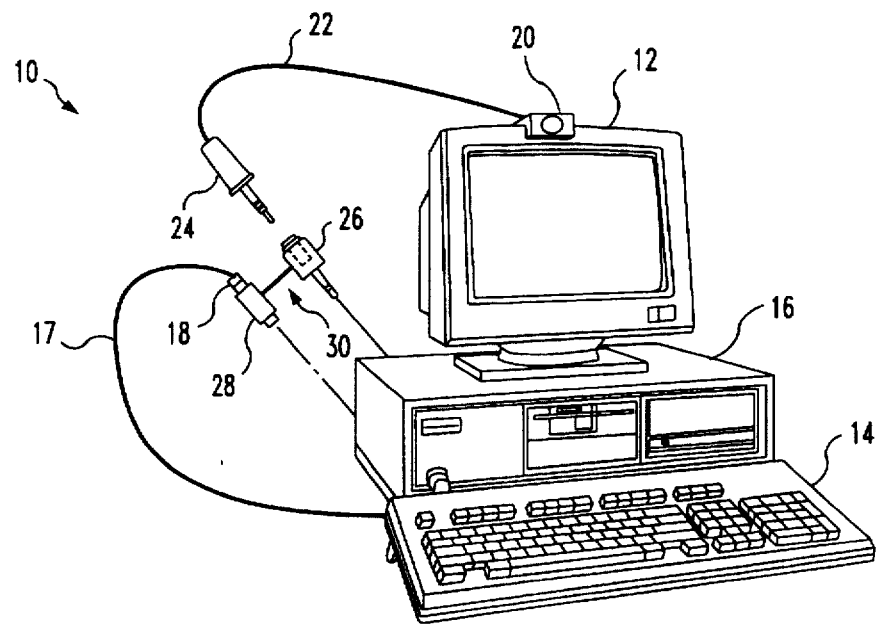
FIG. 1 shows a front perspective view of an illustrative embodiment of the present invention as connected into an existing computer system.

With reference now to FIG. 1, an illustrative embodiment of the present invention will now be described in detail. In FIG. 1, there is shown a computer system 10 which includes a display monitor 12, a keyboard 14, and a processing unit 16. In a conventional manner, keyboard or mouse 14 includes a connector 18 configured for connection, via cable 17, to a first accessory port, such as a PS2 port 19 (shown in FIG. 3) at the rear of processing unit 16. A microphone or monaural audio source 20, as may be employed during operation of computer system 12 in accordance with a telephony and/or speech related application, is shown in an exemplary location on the upper surface of the housing of computer system 16.

As will be readily ascertained by those skilled in the art, conventional computer systems as computer system 10 are often equipped with plug-in cards which enable the system to process audio input signals—such as that received by microphone 20, as well as audio output signals as may be audibly reproduced by one or more loudspeakers (not shown). In that regard, it should be noted that although the inventive adapter assembly 30 of the present invention will be described in connection with a particular illustrative example, in which the audio peripheral device is a microphone, it is also contemplated that the inventive assembly may, either alternatively or additionally, be readily utilized as an interface between computer system 10 and other peripheral devices such as one or more loudspeakers.

In any event, and with continued reference to FIG. 1, it will be seen that microphone 20 includes a cable 22 terminating at an accessory connector plug 24. By way of illustrative example, connector plug 24 may be implemented using the common, personal entertainment headset connector, mini stereo phone plug, or mini audio plug which is only 3.5 millimeters in diameter. As is common, and as best seen in FIG. 2, the mini audio plug 24 has an insulated ring section 32b separating tip section 32a and sleeve section 32c such that isolated electrical connections can be made with conductors 22a, and 22b, respectively, of cable 22.

Figure 2:
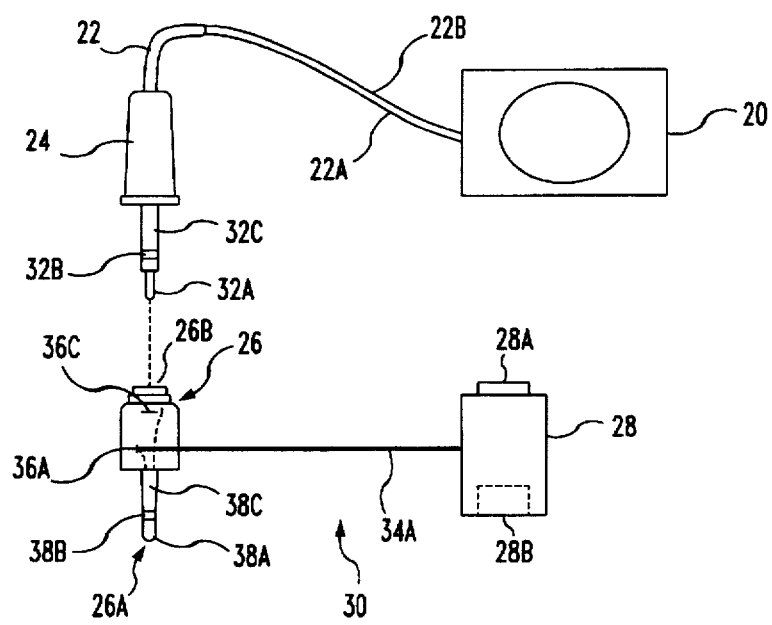
FIG. 2 is an enlarged view of the illustrative accessory connector and adapter assembly of FIG. 1.
Figure 3:
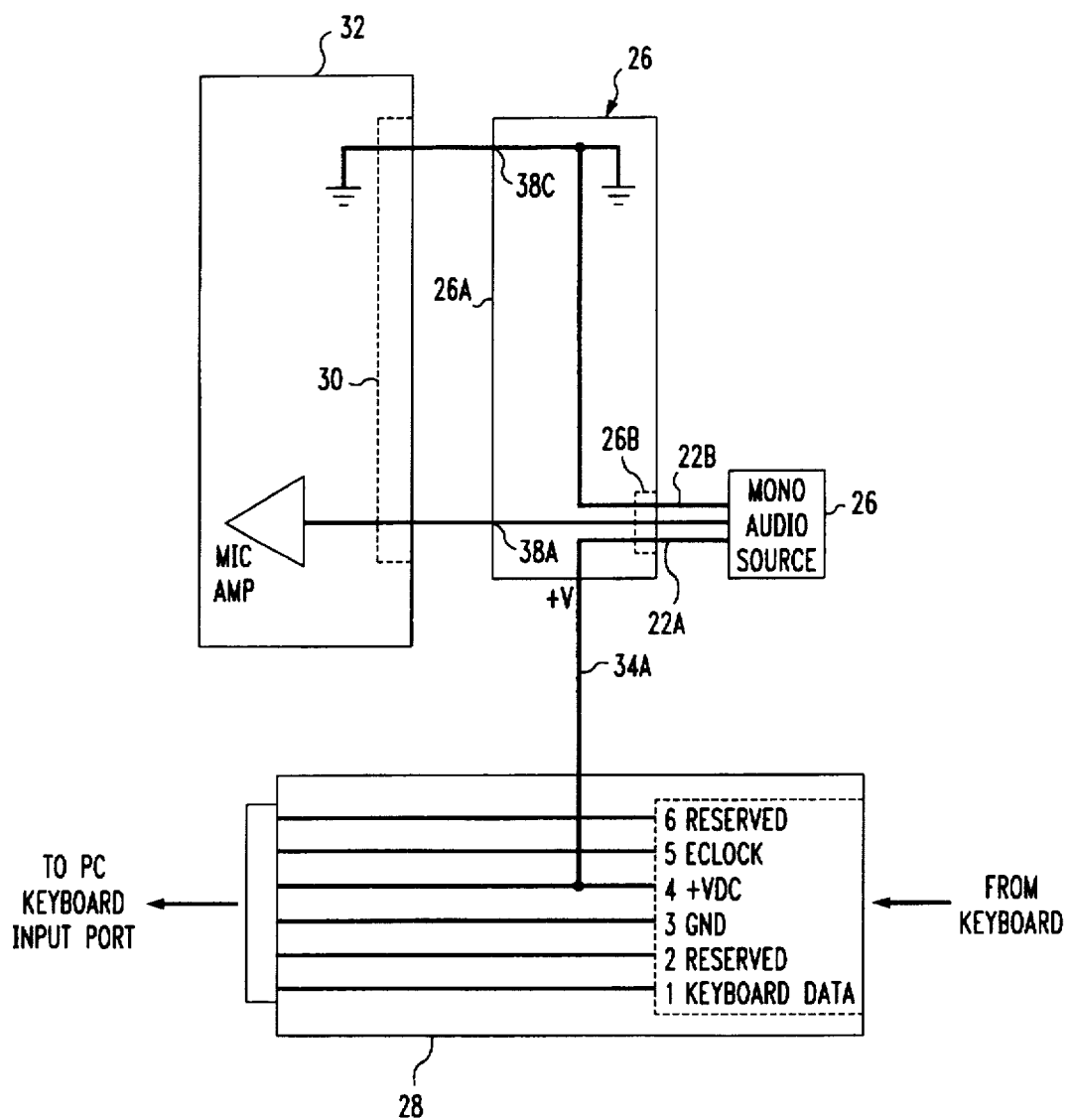
FIG. 3 is an electrical diagram depicting in detail the electrical connections associated with the illustrative accessory connector and adapter assembly of FIGS. 1 and 2.

With particular reference now to FIGS. 2 and 3, the illustrative adapter assembly 30 of the present invention will now be described in detail. Essentially, adapter assembly 30 is operable to supply power derived from PS2 port 19 to microphone 20 and to keyboard 14. To this end, adapter assembly 30 includes a first interface 28 having a first connector portion 28a dimensioned for insertion into the PS2 port 19 located in the rear of processing unit 16 of computer system 10 and a second connector portion 28b dimensioned to accommodate a terminating end of a PS2 connected peripheral cable, such as connector 18 on the end of cable 17, to thereby establish an electrical connection therebetween. Thus, when interconnected between the PS2 port and PS2 peripheral of computer system 10, first interface 28 provides an unbroken electrical path for each of PS2 conductors 1–6 (FIG. 3) so that operation of the PS2 connected peripheral 14 is unaffected. As further shown in FIG. 3, accessory port 19 has a reference voltage terminal 19'.

Adapter assembly 30 further includes a second interface 26 having a first connector portion 26a dimensioned to selectively establish an electrical interconnection with a monaural audio peripheral input port 32 (FIG. 3) of processing unit 16 of computer system 10. In the illustrative embodiment of FIGS. 1–3, the audio peripheral port is an input port that permits audio signals to be received from microphone 20 via a conventional connector plug. Typically, audio port 32 is configured as a standard stereo mini-jack that is well known to those skilled in this art. Thus, by way of specific example, first connector portion 26a may be configured, in the same manner as the connector plug 24 of microphone 20, with an insulated ring section 38b separating tip section 38a and sleeve section 38c. As such, isolated electrical connections can be made to first interface 28 via conductor 34a. Specifically, and as best shown in FIG. 3, electrical connections are made to the +VDC of the PS2 cable. In a typical computer system, the voltage VDC has a value of +5 V, which is suitable for most audio peripheral applications.

With continued reference to both FIGS. 2 and 3, it will be observed that second interface 26 further includes a second connector portion 26b dimensioned to selectively establish an electrical interconnection with the audio peripheral device as microphone or monaural audio source 20 in the illustrative example. As indicated above, illustrative microphone 20 utilizes a male connector plug 24 having isolated tip and base terminals 32a and 32c. Accordingly, second connector portion 26b is configured as a female jack dimensioned and arranged to accommodate plug 24. Respective ring terminals, 36a and 36c, are provided so as to establish respective interconnections between tip terminal 32a and interface +VDC conductor 34a and base terminal 32c. A ground connection is made upon insertion of 26a into connectors of monaural audio input port 32. It will be recognized that port 32 is the port which normally receives the accessory connector plug 24 when the present invention is not utilized. As best shown in FIG. 3, insertion of connector portion 26a interconnects terminals 38a and 38c of second interface 26 to the GND and input signal terminals of audio peripheral port 32, whereupon the microphone or monaural audio source signals are appropriately processed for transmission or storage in accordance with the application.

It should, of course, be noted that while the present invention has been described in reference to illustrative embodiments, other arrangements may be apparent to those of ordinary skill in the art. For example, if it is desired to utilize the assembly of the present invention to power more than one audio peripheral device, second interface 26 may be configured with multiple first and second connector portions so as to interconnect the desired number of audio peripheral ports to a corresponding number of audio peripheral devices. Thus, the invention is not limited to the specific details and illustrative example shown and described in this specification. Rather, it is the object of the appended claims to cover all such variations and modifications as come within the true spirit and scope of the invention.

What is claimed:

1. An accessory connector and adapter assembly for use in a personal computer system comprising a first accessory port having a reference voltage terminal, an accessory cable having cable end connectors insertable into the first accessory port for connection to the reference voltage terminal, and an audio input port, said assembly being operable to supply electrical power to an audio peripheral device coupled to said audio input port and comprising:

a first interface having a first connector portion dimensioned for insertion into the first accessory port and a second connector portion dimensioned to accommodate a terminating end of the accessory cable, to thereby establish an electrical connection therebetween;

a second interface having a first connector portion dimensioned to selectively establish an electrical interconnection with the audio input port and a second connector portion dimensioned to selectively establish an electrical interconnection with the audio peripheral device; and an electrical cable for electrically interconnecting the first and second interfaces, whereby electrical power may be supplied to the audio peripheral device from the reference voltage terminal of the first accessory port.

2. The assembly of claim 1, wherein the first connector of said second interface is a male adapter plug.

3. The assembly of claim 2, wherein the second connector of said second interface is a female adapter jack dimensioned to accommodate a male adapter plug of the audio peripheral device.

4. The assembly of claim 3, wherein the second connector of said second interface is a mini stereo adapter jack dimensioned to accommodate a mini stereo adapter plug of the audio peripheral device.

5. The assembly of claim 1, wherein the first connector of said second interface is a mini stereo adapter plug.

6. The assembly of claim 1, wherein the audio peripheral port is an input port and wherein the audio peripheral device includes a monaural audio source.

7. A telecommunications kit for use in a personal computer comprising a PS2 connected peripheral, a PS2 port having reference voltage, a PS2 cable having cable end connectors insertable into the PS2 port for connection to the reference voltage and an audio peripheral port, said kit comprising:

at least one audio peripheral device; and an accessory connector and adapter assembly operable to supply electrical power to an audio peripheral device coupled to said audio peripheral port, said adapter assembly including a first interface having a first connector portion dimensioned for insertion into the PS2 port and a second connector portion dimensioned to accommodate a terminating end of a PS2 cable, to thereby establish an electrical connection therebetween;

a second interface having a first connector portion dimensioned to selectively establish an electrical interconnection with the audio peripheral port and a second connector portion dimensioned to selectively establish an electrical interconnection with the audio peripheral device; and an electrical cable for electrically interconnecting the first and second interfaces, whereby electrical power may be supplied to the audio peripheral device from the reference voltage of the PS2 port.

8. The kit of claim 7, wherein the first connector of said second interface is a male adapter plug.

9. The kit of claim 8, wherein the second connector of said second interface is a female adapter jack dimensioned to accommodate a male adapter plug of the audio peripheral device.

10. The kit of claim 9, wherein the second connector of said second interface is a mini stereo adapter jack dimensioned to accommodate a mini stereo adapter plug of the audio peripheral device.

11. The assembly of claim 7, wherein the first connector of said second interface is a mini stereo adapter plug.

12. The assembly of claim 7, wherein the audio peripheral port is an input port and the audio peripheral device comprises a monaural audio source.

13. The assembly of claim 12, wherein the audio peripheral port is an output port and the audio peripheral device is a loudspeaker.

* * * * *